Jan. 8, 1935. W. C. HEDGCOCK 1,987,477
TRUCK
Filed July 21, 1931 2 Sheets-Sheet 1
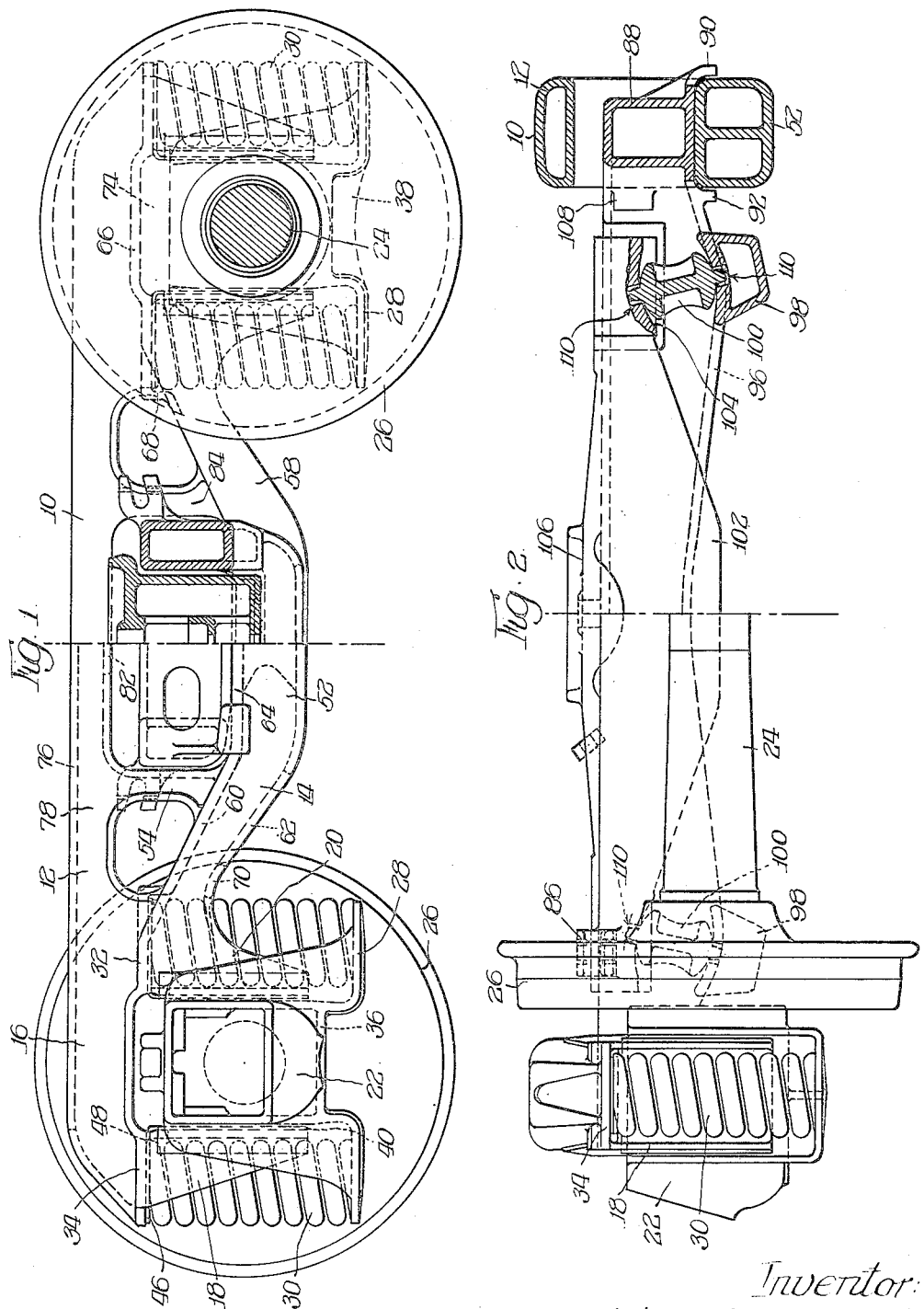
Inventor:
William C. Hedgcock,
By Wilkinson, Huxley, Byron & Knight
Attys

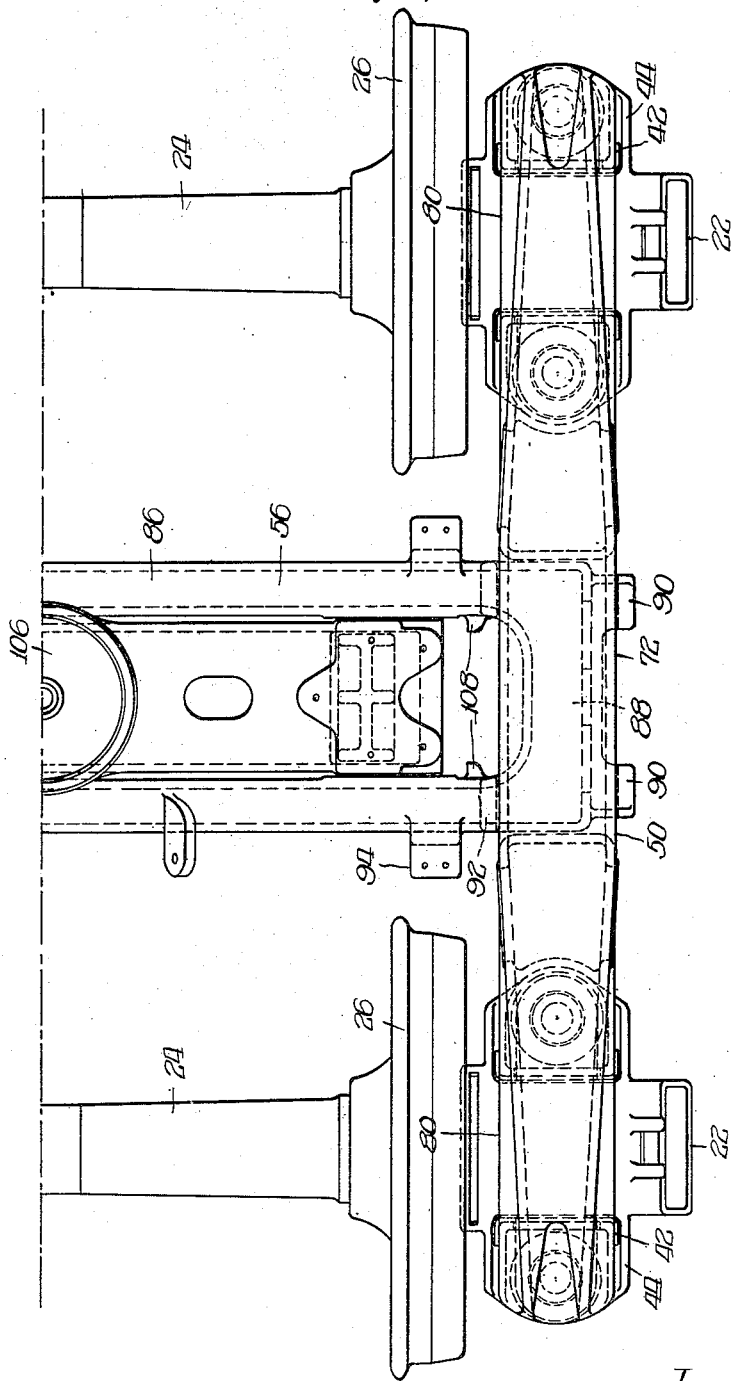

Patented Jan. 8, 1935

1,987,477

UNITED STATES PATENT OFFICE 1,987,477

TRUCK

William C. Hedgcock, Wilmette, Ill., assignor to American Steel Foundries, Chicago, Ill., a corporation of New Jersey Application July 21, 1931, Serial No. 552,157

7 Claims. (Cl. 105—187)

This invention pertains to car trucks.

An object of this invention is to provide a car truck having easy riding qualities for the protection of the car and lading, and one which is adapted to permit of high speed operation without danger of derailment or damage.

Another object of the invention is to provide a truck which lessens the destructiveness of shocks transmitted to the track, truck parts, or car body.

Still another object of the invention is to provide a truck with a spring arrangement which diminishes harmonic spring oscillations.

Yet another object of the invention is to provide a truck with a comparatively small amount of unsprung weight.

A further object is to provide a truck which fulfills all requirements of manufacture and service, and is of simple and economical construction.

With these and various other objects in view, the invention may consist of certain novel features of construction and operation as will be more fully described and particularly pointed out in the specification, drawings and claims appended hereto.

In the drawings, which illustrate an embodiment of the device and wherein like reference characters are used to designate like parts—

Figure 1 is a side elevation partly in section of a truck embodying the invention;

Figure 2 is an end elevation partly in section of the truck shown in Figure 1;

Figure 3 is a top plan view of a half of the truck construction shown in Figure 1.

In the truck construction contemplated, the side frame 10 is of integral construction and is provided with the compression member 12 and the tension member 14. The tension and compression members merge adjacent their ends as at 16, said ends being provided with depending spaced pedestals 18 and 20 adapted to embrace the journal boxes 22 cooperating with the journals 24 of the wheel and axle assemblies 26. The wheel and axle assemblies, of course, may be of the standard A. R. A. construction, or any other desired type. The journal boxes are fashioned in any desired manner for cooperation therewith. The journal boxes 22 have extending and depending seats 28, one on each side of the box, said seats being provided with suitable dowels having cooperative and positioning engagement with the spring nests 30 disposed between each seat 28 and seats 32 and 34 provided on the side frame, said seats being provided with positioning dowels for positioning the spring nests in a similar manner as the aforementioned dowels.

The springs 30, although they may be of the usual form, are preferably helical springs formed with a varying pitch or a plurality of pitches, and thus a plurality of stiffnesses, so that with a given static load their period of oscillation changes within their deflection range. This type of spring is described more in detail in application Serial No. 552,153, filed July 21, 1931.

To obtain the proper advantages of this spring the proportions thereof must be such as to make it considerably greater in height than the usual helical coil springs of the same load and surface. An advantageous position to accomplish this height is alongside the journal boxes, as illustrated in the present application. Ample provision for suitable spring height is afforded by making the spring seats 28 of the journal box on a level below the bottom 36 of the journal box cellar, and, at the same time, this permits making the side frame pedestals 18 and 20 deep enough to provide ample bearing area and good guiding qualities for the journal box. The rib 38 is provided across the bottom of the journal box between the depending spring seats to serve as a strut or base between the spring seat portions and to reenforce them against bending inwardly under load. The load being transmitted equally by the springs arranged symmetrically on each side of the journal box tends to prevent undesired tilting and binding of the journal boxes and the pedestals, the load being applied to the journal boxes considerably below the mounting on the axle still further helping in this respect.

To further lessen the chance of binding between the journal box and pedestals the faces of the journal box are made with a flat contact surface provided for guiding against the associated pedestal, but this surface extends vertically for a limited distance above and below the center of the journal, beyond which point the surface tapers away from the contact line. The normal clearance for vertical sliding between the box and the pedestals will thus permit a certain amount of tilting without binding, and this action is benefited by the shape described, thus permitting a certain small tilting action of the box without impairing its free vertical motion with respect to the side frame.

Should any wear take place as a result of the vertical motion of the journal boxes and the side frame pedestals, it is desired that the side frame be free from such wear on account of the relative high cost of renewal. The pedestals 18 and 20, therefore, are provided with wearing plates 40 which take the wearing action and are readily replaceable. These wearing plates are applied and held in place without any bolts, rivets, welding, or similar attaching means, thus facilitating application for renewal. Each wearing plate has a bearing surface cooperating with the journal box and is provided with flanges 42 which serve as contact faces for the flanges 44 of the journal box, and also serve to position the wearing plate laterally of the pedestal. The plate has a further portion 46 which extends through the opening 48 in the pedestal face of the side frame and is provided with an aperture embracing the top dowel. With the journal box removed from the side frame, the wearing plate is applied by putting the foot 46 through the opening 48, tilting the wearing plate until the aperture passes over the dowel, and then slipping the plate into its desired position. The plate is then held in place by the pressure of the springs and the load thereon, the foot 46 serving as an intermediate spring seat for this purpose.

The width across the side frame at the pedestals is made such as to accommodate the springs, which are partially enclosed therein. The width of the side frame tension member 12 is preferably made substantially the same as the pedestal width so as to avoid bends or kinks in the side walls or flanges 50 of this member which carries tension stresses. The portion 52 of the side frame tension member between the spaced columns 54 is preferably a box section for strength in carrying the superimposed load from the transom 56, since in this respect this member is a beam as well as a tension member. As the tension member continues outwardly and diagonally upward beyond the columns as at 58, it becomes a channel section with the web 60 at the top and with depending flanges 66 having reentrant flanges 62. The web of this channel section is a continuation of the top wall 64 of the section 52 and continues to merge with the inner spring seat 32, and then continues outwardly as at 66 above the journal seat 28, and then continues outwardly above the journal box and to the outer spring seat 34. Thus a continuous tension web is provided between all the load supporting portions. In the inner spring seat 32 a partially circular pocket is formed at 68 to receive and clear the springs, but the principal line of the web 60 continues across the corner of this spring pocket to meet the line of this spring seat at substantially the vertical center line of the spring so that the principal tension forces are carried directly to the center of the spring seat. A tie 70 connects the tension member flanges 66 adjacent the inner spring nest and stiffens the pedestal and tension member against transverse forces.

The side frame compression member 12 has considerable width at its central portion 72 for transverse strength, but this width is preferably narrower beyond the columns 54, and progressively narrower toward and above the pedestals since the transverse moments digress toward the ends of the side frames. Above the pedestals 18 and 20 and the journal box opening 74, the compression and tension members are united to form a box section for strength and stiffness against bending, since this portion of the side frame is a sort of loaded cantilever extending beyond the truss portion. In this box section the web 76 of the compression member forms the top wall and the spring seats 36, and the web 66 forms the bottom walls with the compression member flanges 78 forming the side walls. Since the spring seats and web 66 are wider than the compression member, this box section has in effect the outwardly projecting flanges 80 at its bottom. As the bottom of this section is in tension under load, the greater width of the bottom web provides a large area to resist the tension stresses. The relative closeness of the two walls stiffens the section and reenforces the spring seats 32 and 34 above the springs. The compression member throughout its intermediate length at 72 and 80 is of channel section, having an upper web and depending flanges 78 with the stiffening tie 82. The flanges 78 merge with the side flanges 84 of the columns 54.

So far the characteristics of construction are similar to those of application Serial No. 552,152, filed July 21, 1931. In the present case, however, instead of using a spring plank to tie the side frames together and maintain them in proper position, one with respect to the other, the transom 56 spans the side frames and extends into the opening formed between the column guides 54. The transom is provided with spaced members 86 terminating in the end integral connecting members 88, said members being provided with depending flanges 90 and 92 embracing the portion 52 of the side frames. The spaced members 86 are provided with brake hanger brackets 94 for suspension of brake beams adjacent the wheels, and the lower chords 96 of the spaced members 86 are connected intermediate the side frames with rocker seat members 98 for accommodating rockers 100 on which the bolster 102 is mounted, the bolster being provided with a cooperating rocker seat 104 and the center bearing 106. The rockers serve as a centering device for the bolster, at the same time permitting lateral motion thereof, the members 86 being provided with stops 108 for limiting the lateral motion of the bolster. The preferred construction of the rocker and rocker seats is such as described in application Serial No. 552,152, filed July 21, 1931, in which the contours of the rockers and rocker seats, and the disposition of the rockers, is such that lines drawn through the points of rocking contact converge upwardly in all positions of lateral motion of the bolster. This causes a certain resistance to too free lateral motion whereby the bolster is normally kept in a central position but permits lateral motion to take place when the lateral force is sufficient. The rockers, and the bolster and transom are preferably provided with the interengaging elements 110 whereby the rockers are positioned in relation to the bolster and transom.

With the type of truck described the springs being between the journal boxes and side frames leave only a small necessary part of the truck weight unsprung, which improves riding qualities and diminishes shocks to the track, wheels, axles, journal bearings, and side frame. The use of variable pitch springs diminishes harmonic amplified motion due to vertical track irregularities, and thereby gives steadier riding qualities and prevents amplification of motion or bouncing which might lead to derailment. The use of variable pitch springs gives easier riding qualities to both light and heavy loads. The lateral motion feature diminishes the shock of transverse forces due to curves and track irregularities, and thereby gives easier riding qualities and relieves the truck parts and lading of destructive shocks. The lateral motion feature also provides cross-equalization in the truck due to the curved path followed by the laterally moving bolster, and thereby allows compensation for differences in track level on opposite sides of the truck. When a difference in transverse track level is encountered the bolster may move laterally until the rising of one end thereof and the lowering of the other end compensate for the difference in level, thus tending to equalize the loading of all the wheels and thereby prevent derailment.

It is to be understood that I do not wish to be limited by the exact embodiment of the device shown which is merely by way of illustration and not limitation, as various and other forms of the device will of course be apparent to those skilled in the art without departing from the spirit of the invention or the scope of the claims.

I claim:

1. In a car truck, the combination of a side frame having tension and compression members, pedestals and a transom seat, a journal box mounted between said pedestals and supporting said side frame through springs mounted on said journal box, a transom resting on said transom seat and including spaced members connected inwardly of said side frame by a rocker seat, and a bolster rockingly supported on the rocker seat of said transom between said spaced member.

2. In a car truck, the combination of side frames each provided with tension and compression members, pedestals and a transom opening having a transom seat, journal boxes mounted between said pedestals and supporting said side frames through springs mounted on each journal box, a transom spacing said side frames and having its end portions in said transom openings and resting upon said transom seats and including spaced members connected inwardly of said side frame by rocker seats, and a bolster rockingly supported on the rocker seat of said transom between said spaced members.

3. In a car truck, the combination of side frames each provided with pedestals and a transom opening having a transom seat, journal boxes mounted between said pedestals and supporting said side frames through springs mounted on each journal box, a transom spacing said side frames and having its end portions in said transom openings of less depth than the transom openings and resting upon the transom seats, said transom including spaced members connected inwardly of said side frames by rocker seats, said transom being provided with flanges to engage an edge of each transom seat to prevent disengagement of the transom and side frames, and a bolster rockingly supported on said rocker seats of said transom between said spaced members.

4. In a car truck, the combination of side frames each provided with pedestals and a transom opening having a transom seat, journal boxes mounted between said pedestals and supporting said side frames through springs mounted on opposite sides of each journal box, a transom spacing said side frames and having its end portions in said transom openings of less depth than the transom openings and resting upon the transom seats, said transom being provided with flanges to engage an edge of each transom seat to prevent disengagement of the transom and side frames, said transom including spaced members and rocker seats disposed inwardly of said side frames, and a bolster rockingly supported on said rocker seats and between said spaced members.

5. In a car truck, the combination of side frames each provided with pedestals and tension and compression members providing a transom opening having a transom seat, journal boxes mounted between said pedestals and supporting said side frames through springs mounted on opposite sides of each journal box, a transom spacing said side frames and having its end portions in said transom openings and resting upon said transom seats, said transom including spaced members, said members being connected by seat members disposed inwardly of said side frames, a bolster disposed between said spaced members, and rockers between said bolster and seat members.

6. In a car truck, the combination of side frames each provided with pedestals and a transom opening having a transom seat, journal boxes mounted between said pedestals and supporting said side frames through springs mounted on opposite sides of each journal box, a transom spacing said side frames and having its end portions in said transom openings of less depth than the transom openings and resting upon the transom seats, said transom being provided with flanges to engage an edge of each transom seat to prevent disengagement of the transom and side frames, said transom including spaced members, said members being connected by seat members disposed inwardly of said side frames, a bolster disposed between said spaced members, and rockers between said bolster and seat members.

7. In a car truck, the combination of a side frame having tension and compression members and spaced integrally connecting columns forming a window, a transom including spaced members and an end connecting member, said transom being seated in said window and having spaced flanges embracing the tension member, a bolster mounted for lateral movement between said spaced members, said tension and compression members merging adjacent the ends thereof and provided with spaced pedestals, a journal box slidably disposed between said pedestals and having spring seats disposed below the cellar thereof, the merged portion of said tension and compression members having spring seats adjacent each pedestal, and springs disposed between said last named seats and the journal box seats.

WILLIAM C. HEDGCOCK.